R. E. HANKAR.
APPARATUS FOR SEPARATING LIQUIDS.
APPLICATION FILED NOV. 21, 1917.
Patented Jan. 21, 1919.
3 SHEETS—SHEET 1.
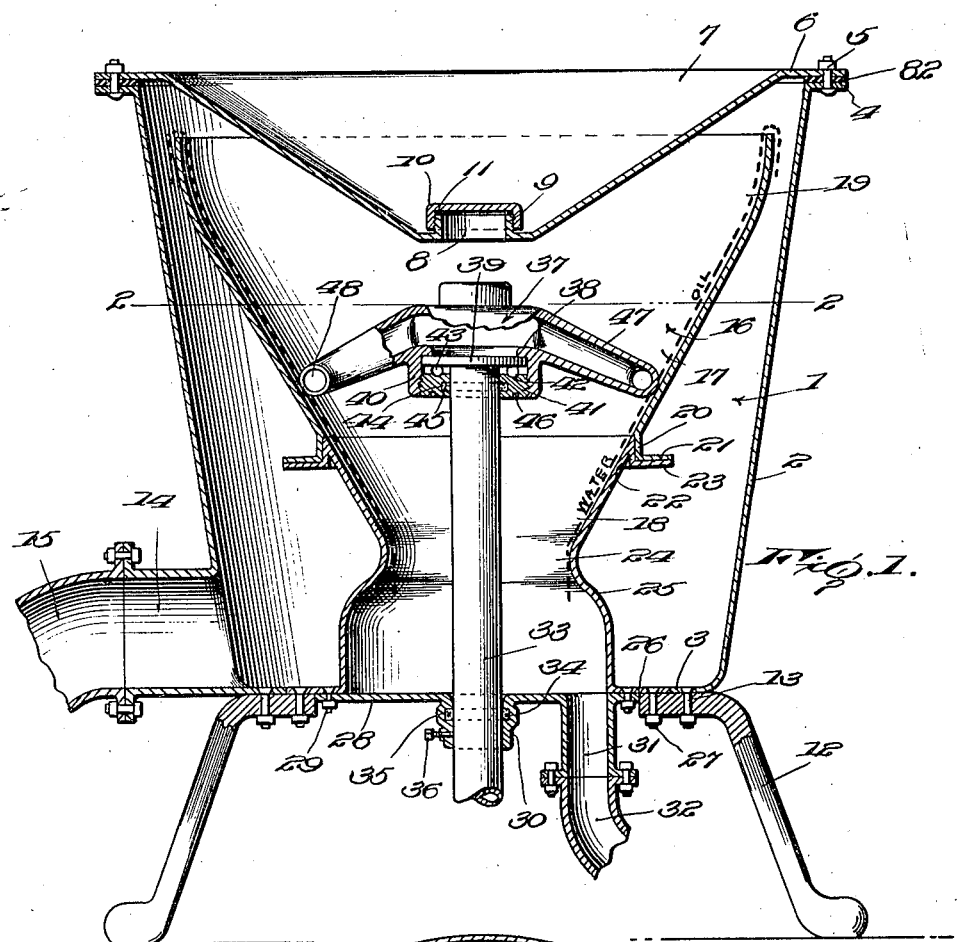
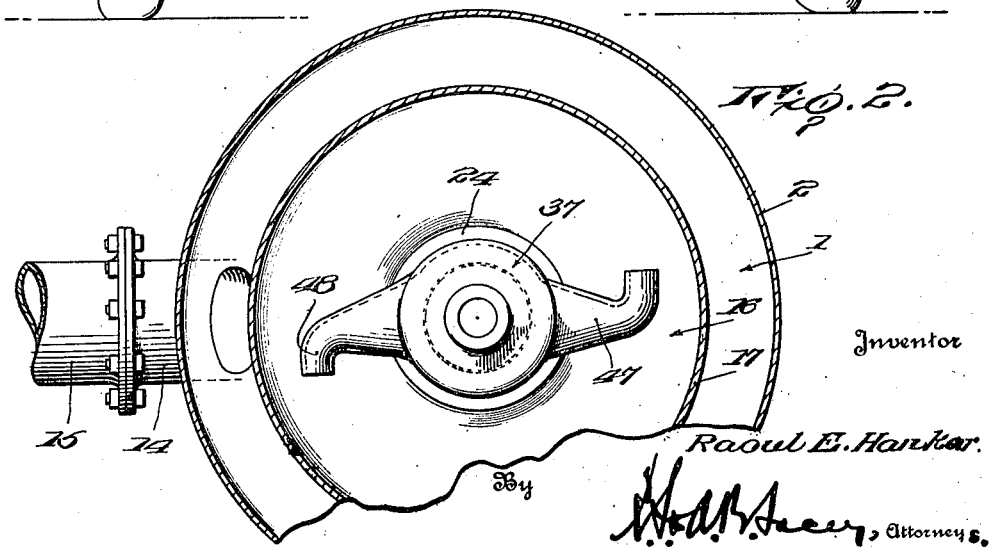
Inventor
Raoul E. Hankar.
By
Attorneys.

Inventor
Raoul E. Hankar.

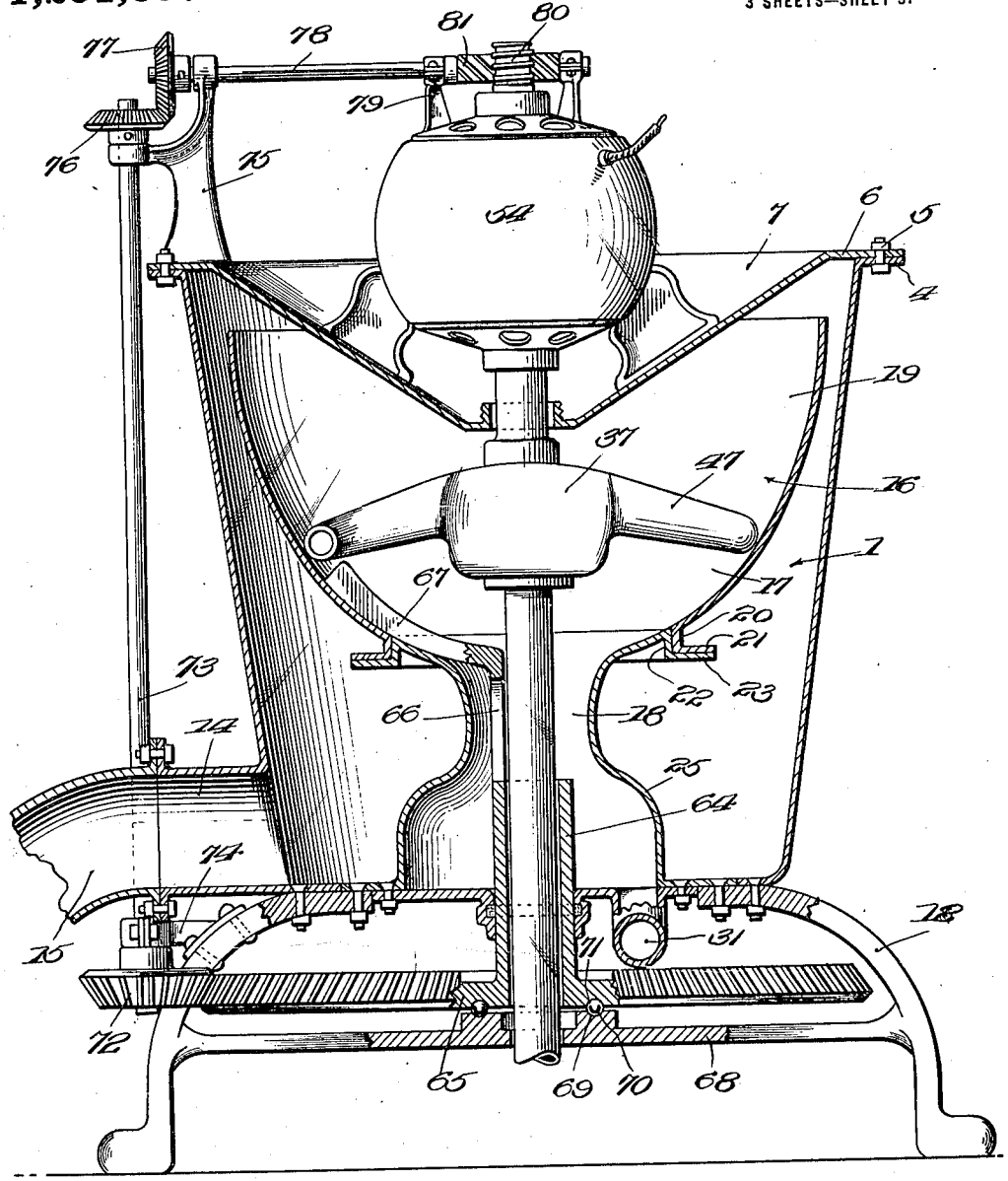

UNITED STATES PATENT OFFICE.

RAOUL E. HANKAR, OF WASHINGTON, DISTRICT OF COLUMBIA.

APPARATUS FOR SEPARATING LIQUIDS.

1,291,857.

Specification of Letters Patent. Patented Jan. 21, 1919.

Application filed November 21, 1917. Serial No. 203,213.

*To all whom it may concern:*

Be it known that I, RAOUL E. HANKAR, a citizen of France, residing at Washington, District of Columbia, have invented certain new and useful Improvements in Apparatus for Separating Liquids, of which the following is a specification.

This invention relates to apparatus for the separation of mixtures of liquids having different specific gravities and is designed more especially for use in the separation of oil from water and impurities mixed therewith in its natural state, and from acid and alkali solutions with which it is treated during the process of refining. Petroleum or crude oil as it issues from the wells usually contains a large percentage of water and impurities and is usually piped into large storage tanks for future refining, or if the refinery is not located at the wells, the oil in its crude state together with the water and impurities mixed therewith must be transported in tank cars or pipe lines to the refinery. In the first instance considerable storage space is taken up in the tanks by the water and impurities mixed with the crude oil, and in the second instance considerable additional expense is incurred in transporting the water and impurities mixed with the oil, to the refinery. It is obviously desirable, therefore, that the oil be separated at the wells from the water and impurities mixed therewith so that the full capacity of the storage tanks may be utilized in the storage of the oil alone and so that the expense heretofore incurred in transporting the mixture of oil and water to the refinery will be greatly lessened. Furthermore, in the carrying out of the refining process the crude oil is usually treated with acid and alkali solutions in order to remove from the oil the impurities mixed therewith and after each washing step it is necessary to separate the oil from the solution with which it is treated. Ordinarily this is accomplished by a process of deposition in the carrying out of which the oil mixed with the solution with which it has been treated must be permitted to stand for a considerable length of time to permit of separation of the liquids by their difference in specific gravities, this process of deposition being carried out in large tanks which occupy considerable area and which are expensive to erect. The present invention, therefore, aims to provide an apparatus which in the first instance may be employed at the wells for separating the crude oil from the water and from the impurities mixed with it in its natural state as it issues from the wells, so that the use of the large storage tanks mentioned may be limited to the storage of the oil alone and so that the expense heretofore incurred in transporting the oil and water mixture from the wells to the refinery may be greatly decreased. The apparatus embodying the present invention is also designed for employment at the refineries in separating the oil from the solutions with which it is treated in the steps of the refining process so that the steps of separation by deposition may be eliminated, thus greatly shortening the time required in refining the oil.

The apparatus embodying the present invention is so constructed that by its use the oil and water may be effectually and expeditiously separated at but little cost, and the separation will be continuous.

It is also an aim of the invention to provide for adjustment of the apparatus so as to adapt the same for the separation of more or less viscous mixtures or of mixtures of varying densities so that the same apparatus may be employed in separating the constituents of a relatively light mixture as well as in separating the constituents of a heavier mixture, the apparatus being also so constructed as to be adapted for use in the separation of emulsified mixtures as well as simple mixtures.

In one form of the invention the apparatus is of such construction that the mere feeding by gravity of the mixture to the apparatus will serve as a means for maintaining the apparatus in operation so that the expense incident to driving such an apparatus by power means is eliminated. In a slightly modified form of the invention wherein the apparatus is power operated, the said apparatus with a slight change is adapted to act upon and separate exceptionally heavy or viscous mixtures of oil and water. It frequently occurs that petroleum or crude oil as it issues from the wells contains solid impurities, usually sand, and in a further modified form of the invention means is provided for automatically removing from the apparatus the sand contained in the mixture so as to prevent clogging of the apparatus by the sand which would, of course, interfere with the proper functioning of the apparatus.

In the accompanying drawings:

Figure 1 is a vertical sectional view through an apparatus embodying the present invention;

Fig. 2 is a horizontal sectional view on the line 2—2 of Fig. 1;

Fig. 4 is a similar view illustrating the means provided for removing the accumulations of sand or other solid foreign matter.

Figure 3:
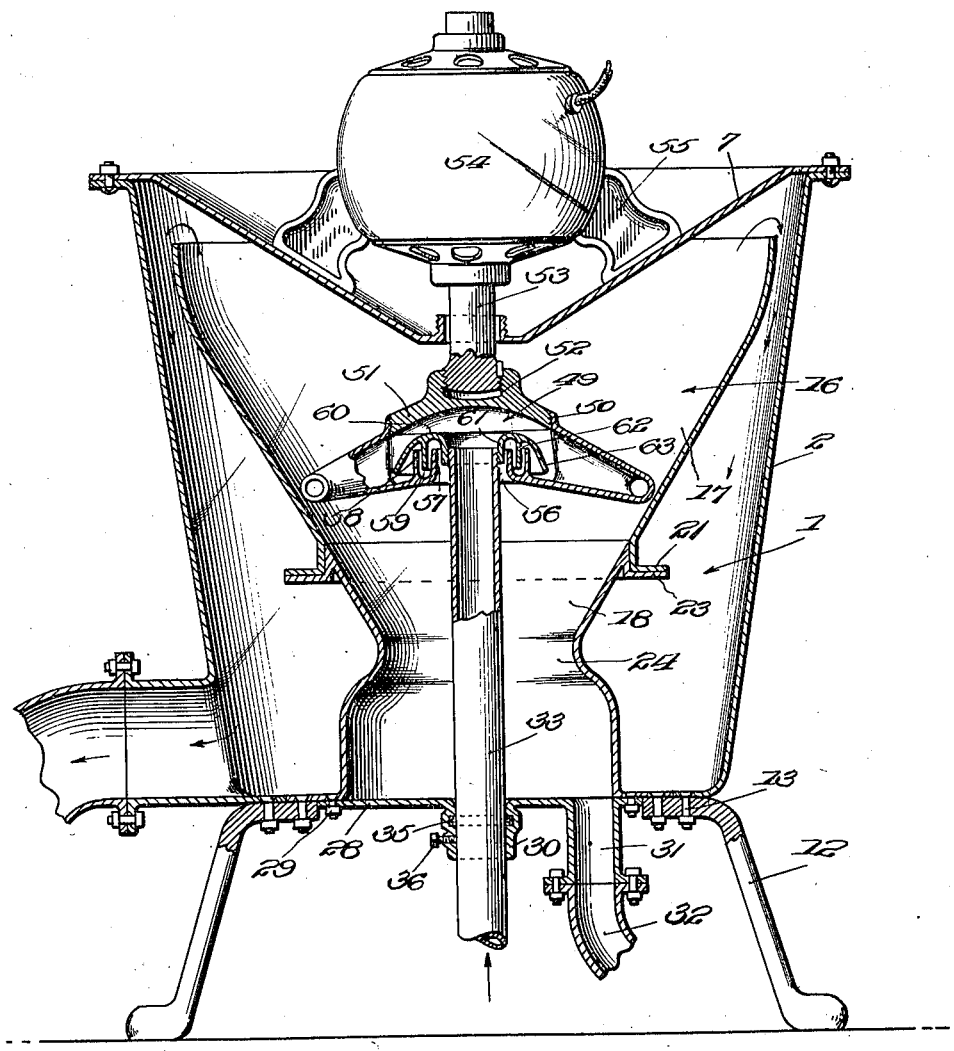
Fig. 3 is a view similar to Fig. 1 illustrating a modification of the apparatus designed for use in the separation of the heavier or more viscous mixtures.

In all forms of the invention the apparatus includes an outer or oil collecting bowl indicated in general by the numeral 1, this bowl, preferably although not necessarily, being of substantially conical form, as shown in Figs. 1, 3 and 4 of the drawings. The wall of the bowl, indicated by the numeral 2, is provided at its bottom with an inwardly directed annular flange 3 which constitutes a portion of the bottom of the said bowl or more specifically a portion of the bottom of the oil collecting chamber provided by the bowl. At its top the wall 2 is provided with an outstanding circumscribing flange 4 upon which is disposed and removably secured as at 5, the outstanding flange 6 of a conical cover 7 which serves to substantially close the bowl 1 at its upper end, the said cover 7 being arranged with its concave side uppermost and consequently extending downwardly into the said bowl 1. For a purpose to be presently explained the cover 7 is formed centrally with an opening 8 surrounded by an upstanding frame 9 which is exteriorly threaded to provide for the application thereto of a closure cap 10 between which cap and the upper edge of the flange may be interposed a packing gasket or washer 11. The bowl is supported by means of suitable legs 12 to which the flange 3 is bolted or otherwise secured as at 13 and at one side the said bowl is provided with an outlet 14 which is connected to a suitable conducting pipe 15 through which the separated oil may flow to any desired point of discharge.

Arranged within the oil collecting bowl 1 is the separator bowl which is indicated in general by the numeral 16, this separator bowl comprising an upper section 17 and a lower section 18. From its lower end to a point adjacent its upper end, the section 17 of the separator bowl is of frusto-conical form, its walls being straight, but adjacent the upper end of the said section the wall of the same is of conoidal form, as indicated at 19. In other words, from its lower end the section 17 is upwardly flared along straight lines to a point adjacent the upper end thereof, from which point the wall is upwardly flared along curved lines. While I have found it preferable to employ a bowl of the contour described, it will be understood that the shape of the bowl may be modified if found advisable. The upper portion of the section 18 of the separator bowl constitutes a downward continuation of the lower portion of the wall of the upper section 17 of the said bowl, and in order that the sections may be assembled in a water-tight manner, the wall of the upper section is provided at its lower end with a depending cylindrical portion 20 having an outstanding circumscribing horizontally disposed flange 21, the portion 20 fitting around a similar portion 22 at the upper end and upon the exterior of the section 18, and the said flange 20 resting upon a similar flange 23 formed integral with and outstanding from the portion 22. Between its upper and lower ends, the section 18 is interiorly relatively narrow, as indicated by the numeral 24, and below this portion the said section is outwardly bulged, as at 25, and at the bottom of its bulged portion is formed with an outstanding circumscribing flange 26 which is bolted or otherwise secured as at 27 upon the upper ends of the supporting legs 12, the periphery of the flange 26 meeting the periphery of the flange 3 upon the wall 2 of the oil collecting bowl. The bottom of the bowl 16 comprises a plate 28 which is bolted or otherwise secured to the under side of the flange 26, as indicated by the numeral 29, and for a purpose to be presently explained the said plate 28 is formed centrally upon its under side with a depending hollow portion 30, and to one side of its center with a depending outlet branch 31 to which is connected any suitable conducting pipe 32 designed to carry off the water and the impurities which have been separated from the oil during the washing step in the process of refining.

The mixture of oil and water is delivered to the apparatus through a pipe 33 which is slidably fitted vertically through the hollow portion 30 and in order to provide a liquid-tight connection between the pipe and the said portion a suitable packing 34 is arranged within a groove 35 formed in the inner surface of the hollow portion 30 and surrounding the said pipe 33. For a purpose to be presently explained, the pipe 33 is vertically adjustable through the hollow portion 30 and in order that the pipe may be held in positions of adjustment a set screw 36 is adjustably fitted through one side of the hollow portion 30 and when tightened bears at its inner end against the side of the plate 33. In that form of invention shown in Figs. 1 and 2 of the drawings the upper or discharge end of the pipe 33 communicates with a head which is rotatably supported upon the said upper end of the pipe, this head being indicated in general by the numeral 37. The body of the head 37 is hollow and substantially circular in form and the head is formed interiorly with an annular flange 38 seating against the upper side of a flange 39 formed exteriorly upon the upper end of the pipe 33. The under side of the head is provided with an integral depending hollow portion 40 which is interiorly threaded to receive a ring 41 provided in its upper surface with a ball race 42. Bearing balls 43 are disposed within the race 42 and serve to reduce friction between the pipe and head in the rotation of the said head, it being understood that the mixture entering the head through the upper end of the pipe 33 will tend to lift the said head so as to cause the bearing balls 43 to travel against the under side of the flange 39. In order to provide a liquid-tight connection between the head and pipe 33, the collar 41 is preferably formed interiorly with a groove 44 in which is seated a packing gasket 45 contacting and surrounding the pipe 33. The under side of the collar 41 is preferably formed with sockets 46 to permit of the application to the collar of a spanner wrench for the purpose of fitting the collar into place, removing the same, or adjusting the said collar.

As before stated the head 37 is hollow and the said head is provided at diametrically opposite points with tubular discharge nozzles 47 which extend substantially radially from the said head and which have their discharge ends turned at an angle, as indicated by the numeral 48, and presented in a direction the opposite to that in which the head is to be rotated, the said discharge ends of the nozzles being located relatively close to the inner surface of the wall of the upper section 17 of the separating bowl.

From the foregoing description of this form of the invention it will be understood that the mixture to be separated is discharged into the head 37 through the upper end of the pipe 33 and as it issues from the head through the discharge nozzle 47, rotary motion will be imparted to the said head 37 and the mixture will be discharged in streams or jets directly against the inner surface of the section 17 of the separator bowl, thus forming a vortical film of the mixture upon the said surface of the bowl. As the liquid mixture strikes the wall of the bowl it will be so broken up that the oil and water will be effectually and instantaneously separated, the vortical film formed dividing into a portion flowing upwardly along the inner surface of the separator bowl and over the upper edge thereof and into the oil collecting bowl 1, this portion of the film consisting solely of oil, and another portion flowing downwardly along the said surface of the bowl and out through the pipe 32 and consisting of the water and impurities mixed therewith. It will be understood that in this form of invention the apparatus is especially adapted for use in the separation of the lighter and less viscous mixtures and that the apparatus is automatic in its operation, the head 37 being rotated through the force exerted by the liquid mixture issuing from the nozzles 48. It will also be understood that the apparatus may be readily adjusted for the separation of mixtures of varying densities by loosening the set screw 36 and adjusting the pipe 33 so as to raise or lower the head 37 within the separator bowl.

In that form of the invention shown in Fig. 3 of the drawings, the structure is the same as that previously described with the exception of the rotary head, which is modified for the application thereto of power means whereby it is driven. In Fig. 3 the head is indicated in general by the numeral 49, and the body thereof is formed in its upper side with an opening and a surrounding flange 50 which is interiorly threaded to accommodate a cap 51 which is fitted into the said opening and which is formed in its upper side with a threaded socket 52 into which is removably fitted the lower end of the shaft 53 of an electric or other type of motor 54, the motor being supported upon a suitable base or standards 55 in turn supported upon the upper side of the cover 7, it being observed that the shaft 53 extends through the opening 8 in the said cover, the cap 9 being removed for this purpose. Interiorly the head 49 is formed in its under side with an opening 56 surrounding which is an upstanding annular flange 57, the said body of the head being further formed interiorly with a flange 58 which surrounds the flange 57 and is located in spaced relation with respect thereto so as to provide an annular channel 59. The upper end of the pipe 53 extends into the opening 56 and the said pipe is of a diameter considerably less than the diameter of the said opening. Removably threaded onto the upper end of the pipe is an annular head 60 which is exteriorly of substantially conoidal form, the head having three concentric flanges, indicated one by the numeral 61, another by the numeral 62 and the third by the numeral 63. The flange 61 which is the innermost flange is interiorly threaded to adapt it to be threaded upon the upper end of the pipe 33, as before stated, and the flange 62 is of such diameter as to fit between the flanges 57 and 58 and depend into the channel 59 but out of contact with the walls of the said channel formed by the said flanges 57 and 58. The flange 63 surrounds the flange 58 and constitutes in fact the body of the head 60, the outer surface of this flange being, as stated, of substantially conoidal form. It will be understood from the foregoing description of this form of the invention that the head 49 is supported by and rotated through the medium of the motor shaft 53, this shaft being preferably vertically adjustable so as to permit of the head 49 being similarly adjusted to adapt the apparatus for use in the separation of mixtures of varying densities, so that upon adjustment of the head 49 in an upward or downward direction, the pipe 33 may be correspondingly adjusted so that the head 60 at the upper end of the pipe will maintain its proper relation to the head 49. It will also be understood that the flanges 57 and 58 forming the channel 59, and the flange 62, coact to provide a liquid seal between the discharge head 49 and the said head 60.

That form of invention shown in Fig. 4 of the drawings does not differ materially from the form previously described, this figure illustrating, in addition to the previously described structure, means which is provided for preventing the accumulation of sand or other foreign matter within the apparatus. In the said figure the pipe 33 extends upwardly through the sleevelike hub 64 of a large bevel gear 65, this hub fitting through the hollow portion 30 and being rotatable therein. At its upper end the hub 64 is provided with an upstanding arm 66 which extends beside the pipe 33 and which carries at its upper end a scraper blade 67 which moves over the inner surface of the separator bowl 16 at the lower portion thereof so that sand or other solid particles of foreign matter separated from the oil will be prevented from accumulating upon this surface of the bowl. A spider 68 is supported by the supporting legs 12 beneath the bottom of the oil collecting bowl and this spider has its body portion formed with a ball race 69 in which are arranged bearing balls 70 which seat also in a race 71 formed in the under side of the gear 65, the said gear being in this manner supported for rotation. A bevel pinion 72 meshes with the gear 65 and is fixed at the lower end of a shaft 73 mounted in suitable bearings 74 and 75 located respectively upon one of the supporting legs 12 and the flange 6 of the cover 7. At its upper end this shaft 73 carries a bevel pinion 76 which meshes with a similar pinion 77 fixed upon the outer end of a shaft 78 mounted in the said bearing 75 and in bearings 79 upon the casing of the motor 54. The upper end of the motor shaft is provided with a worm gear 80 which meshes with a worm 81 upon the inner end of the shaft 78 and thus, in the operation of the apparatus, rotary motion is transmitted through the shafts 78 and 73 to the gear 65 causing the scraper blade 67 to travel around the inner surface of the bowl.

It will be understood that the relative proportions of the several parts may be varied as desired and that the diameter of the neck portion 24 of the lower section 18 of the separator bowl may be increased or decreased in accordance with the characteristics of the liquid mixture to be separated.

In order to provide for elevation of the cover 7 for the collecting bowl 1 when it is desired to considerably elevate the distributing head of the apparatus, one or any desired number of annular washers 82 may be interposed between the flanges 4 and 6, the bolts 5 passing also through the said washers, or if desired washers of various thicknesses may be employed for this purpose.

From the foregoing it will be apparent that due to the connection provided between the sections 17 and 18 of the separator bowl, the section 17 may be readily lifted from position upon the section 18 and another section 17 of a different contour or size may be readily substituted therefor, so that in this manner without any considerable disarrangement of the apparatus, various forms of separator bowls may be substituted one for another. It will also be understood that various forms of distributer heads 37 may be employed and that the number and size of the distributing nozzles may be varied.

Having thus described the invention, what is claimed as new is:

1. In a separator for liquids having different specific gravities, a separator bowl having a substantially conoidal inner surface and provided with upper and lower outlets, and means for creating a vortical film of the liquids upon said surface.

2. In a separator for liquids having different specific gravities, a separator bowl having upper and lower outlets, a rotatable head within the bowl having a discharge presented at an angle toward the wall of the bowl, and means for supplying the liquids to be separated to the said head.

3. In a separator for liquids having different specific gravities, a separator bowl having upper and lower outlets, a rotatable head within the bowl having a discharge presented at an angle toward the wall of the bowl, and means for supplying the liquids to be separated to the said head, the said head being vertically adjustable within the said bowl.

4. In a separator for liquids having different specific gravities, a collecting bowl having an outlet, a separator bowl arranged within the collecting bowl and having an open upper discharge end and provided at its lower portion with an outlet, and means for creating a vortical film of the liquids upon the inner surface of the separator bowl.

5. In a separator for liquids having different specific gravities, a separator bowl opened at its upper end and provided at its lower portion with a discharge, a collecting bowl inclosing the separator bowl and having an outlet, a pipe vertically adjustably mounted within the separator bowl for conveying the liquids to be separated, and a rotatable head supplied with the liquids by said pipe and having a discharge presented at an angle toward the inner surface of the separator bowl, the said head being adjustable with the said pipe.

6. In a separator for liquids having different specific gravities, a separator bowl, a liquid supply pipe vertically adjustable within the said bowl, a rotaable shaft extending into the bowl, a discharge head carried by the shaft and supported for rotation therewith and having a discharge nozzle extending toward the wall of the bowl, the said head being provided interiorly with spaced concentric upstanding flanges, the discharge pipe extending at its upper end into an opening in the under side of the said head surrounded by one of the said flanges, and a head carried by the upper end of the pipe and provided with a flange depending between the first-mentioned flanges whereby to provide a liquid seal.

7. In a separator for liquids having different specific gravities, a separator bowl, a liquid supply pipe vertically adjustable within the said bowl, a rotatable shaft extending into the bowl, a discharge head carried by the shaft and supported for rotation therewith and having a discharge nozzle extending toward the wall of the bowl, the said head being provided interiorly with spaced concentric upstanding flanges, the discharge pipe extending at its upper end into an opening in the under side of the said head surrounded by one of the said flanges, and a head carried by the upper end of the pipe and provided with a flange depending between the first-mentioned flanges whereby to provide a liquid seal, the said head upon the pipe having an outwardly curved depending flange surrounding the outer one of the first-mentioned flanges.

8. That method of separating mixtures of liquids having different specific gravities which consists in impinging a rotating jet of the mixture against an inclined separating surface to create a vortical film of the mixture moving over said surface.

9. In a separator for liquids of different specific gravities, a separator bowl having an outlet in its lower portion, a collecting bowl having an outlet in its lower portion and inclosing the separator bowl, the separator bowl being arranged at its upper portion to discharge into the collecting bowl, a supply pipe having its discharge end extending upwardly centrally within the separator bowl, a head rotatable with relation to the said pipe and arranged to receive the mixture discharged from the pipe, and discharge nozzles extending in opposite directions from the head with their discharge ends located relatively close to the inner surface of the separator bowl.

10. In a separator for liquids of different specific gravities, a separator bowl having an outlet in its lower portion, a collecting bowl having an outlet in its lower portion and inclosing the separator bowl, the separator bowl being arranged at its upper portion to discharge into the collecting bowl, a supply pipe having its discharge end extending upwardly centrally within the separator bowl, a head rotatable with relation to the said pipe and arranged to receive the mixture discharged from the pipe, discharge nozzles extending in opposite directions from the head with their discharge ends located relatively close to the inner surface of the separator bowl, and means for imparting rotary motion to the said head.

11. In a separator for liquids of different specific gravities, a separator bowl having an outlet in its lower portion, a collecting bowl having an outlet in its lower portion and inclosing the separator bowl, the separator bowl being arranged at its upper portion to discharge into the collecting bowl, a supply pipe having its discharge end extending upwardly centrally within the separator bowl, a head rotatable with relation to the said pipe and arranged to receive the mixture discharged from the pipe, discharge nozzles extending in opposite directions from the head with their discharge ends located relatively close the inner surface of the separator bowl, means for imparting rotary motion to the said head, and means provided between the said pipe and the said head for the formation of a liquid seal.

12. In a separator for liquids having different specific gravities, a separator bowl, a liquid supply pipe extending upwardly into the bowl, a head rotatably supported within the bowl at the discharge end of the pipe and having a discharge nozzle extending toward the wall of the bowl, the said head having an opening in its under side into which the discharge end of the pipe extends and being provided interiorly surrounding said opening with a channel, means for rotating the said head, and a head mounted upon the discharge end of the pipe and having a flange extending downwardly and continuously within said channel whereby to provide a liquid seal.

13. In a separator for liquids having different specific gravities, a separator bowl, a liquid supply pipe extending upwardly into the bowl, a head rotatably supported within the bowl at the discharge end of the pipe and having a discharge nozzle extending toward the wall of the bowl, the said head having an opening in its under side into which the discharge end of the pipe extends and being provided interiorly surrounding said opening with a channel, means for rotating the said head, and a head mounted upon the discharge end of the pipe and having a flange extending downwardly and continuously within said channel whereby to provide a liquid seal, the last-mentioned head being provided with a second flange of substantially conoidal form and extending downwardly and outwardly and surrounding the said channel.

14. In a separator for liquids having different specific gravities, a separator bowl having upper and lower outlets respectively for the lighter and heavier liquids, and means for directing a rotating jet of the liquids against the surface of the bowl between the said outlets, in a direction substantially tangential to the surface of the bowl, whereby to create a film of the liquids moving circumferentially within the bowl.

15. In a separator for liquids having different specific gravities, a separator bowl having upper and lower outlets, and means for directing a rotating jet of the liquids against the surface of the bowl between the outlets to create a film of the liquid moving circumferentially within the bowl.

16. That method of separating liquids having different specific gravities which consists in creating a moving film of the liquids upon a separating surface, thereby separating the lighter liquid from the heavier liquid and collecting the lighter liquid from the upper portion of the surface and the heavier liquid from the lower portion of the said surface.

In testimony whereof I affix my signature.

RAOUL E. HANKAR.